Sept. 15, 1936.    F. W. STORCK    2,054,344
ADDRESSING MACHINE
Filed March 16, 1935    6 Sheets-Sheet 1

Inventor.
Frederick W. Storck.
by Ernest R. Llewellyn.
Atty.

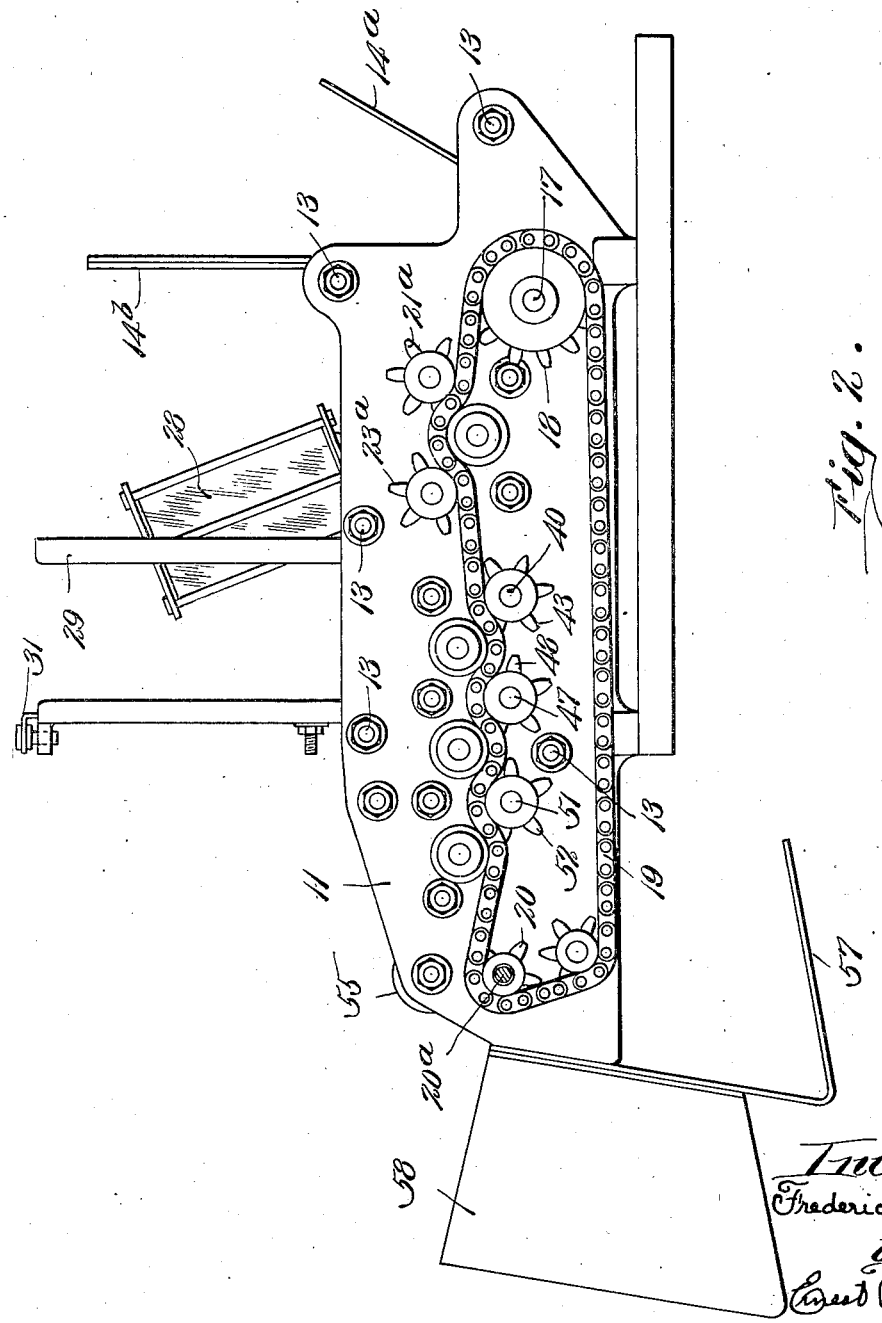

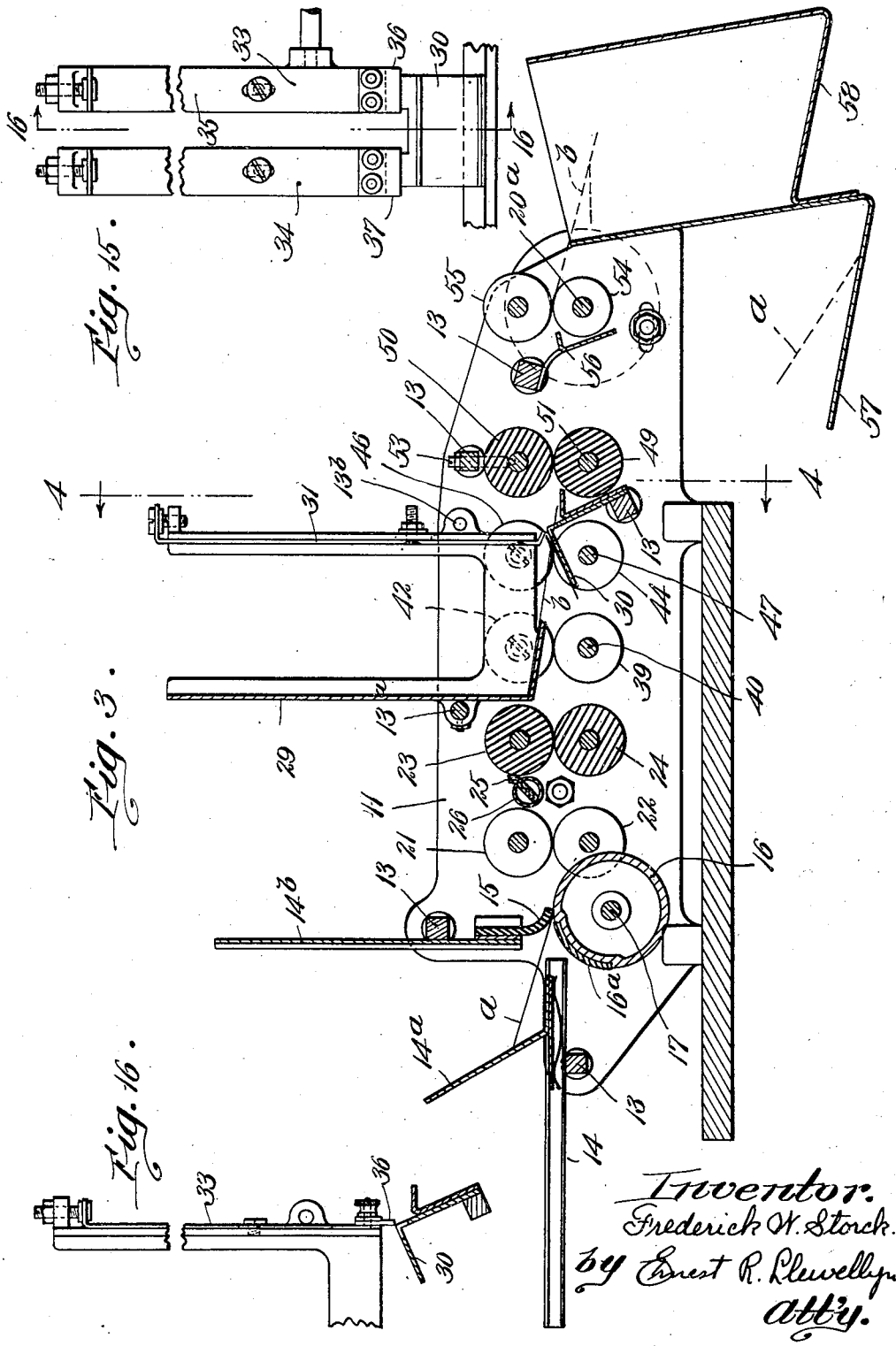

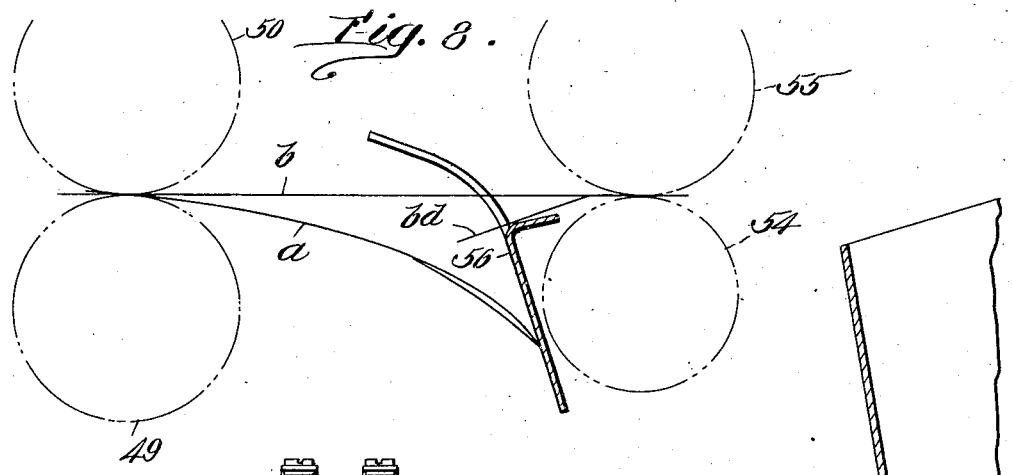
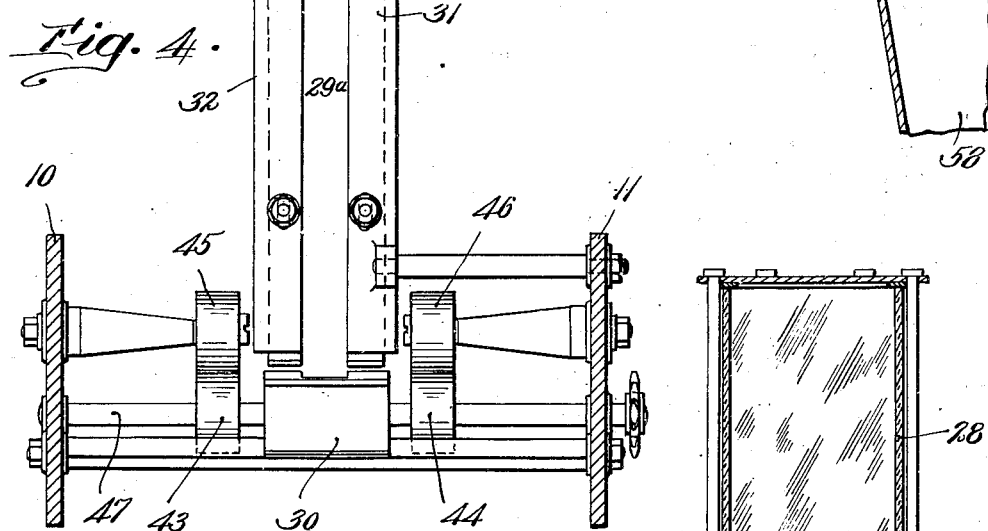
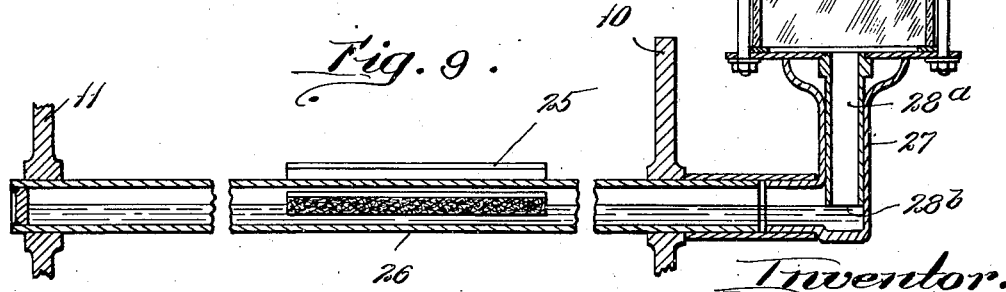

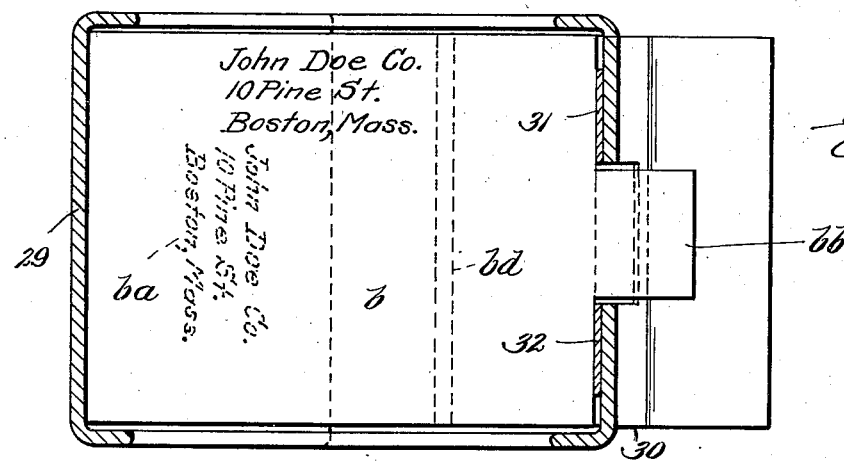
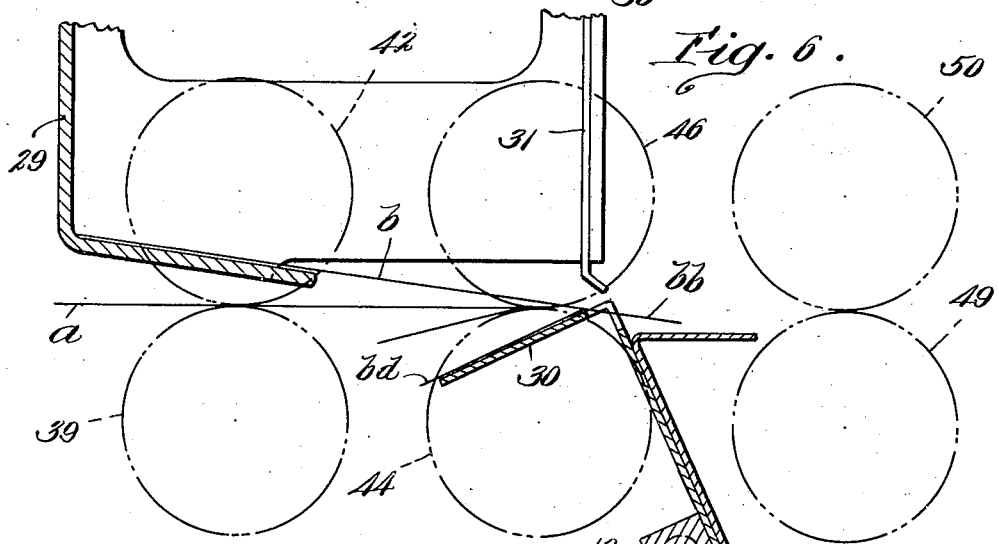
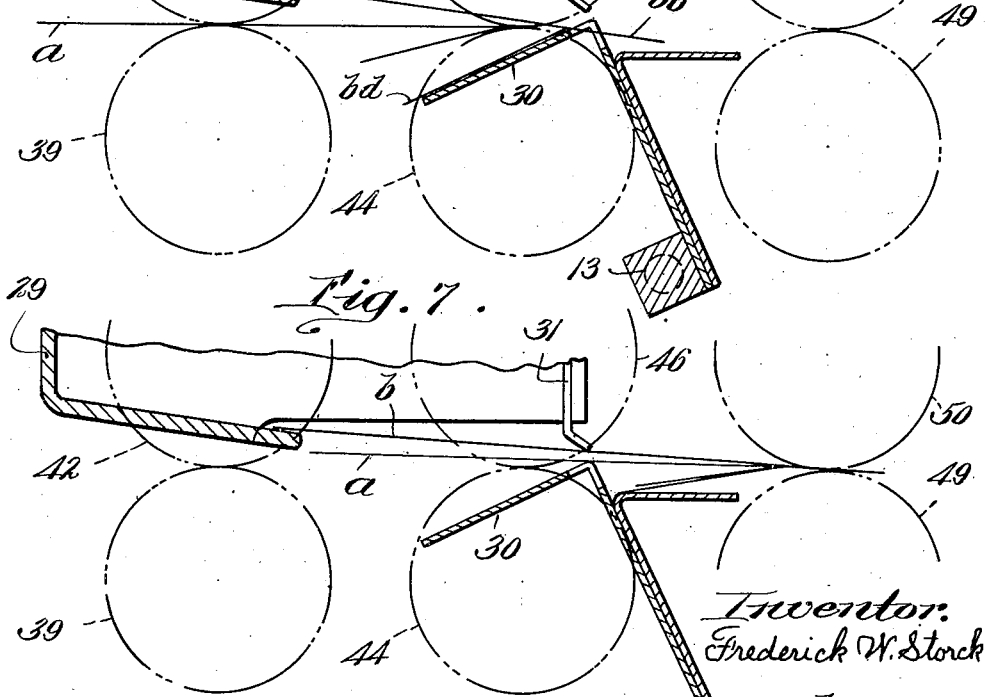

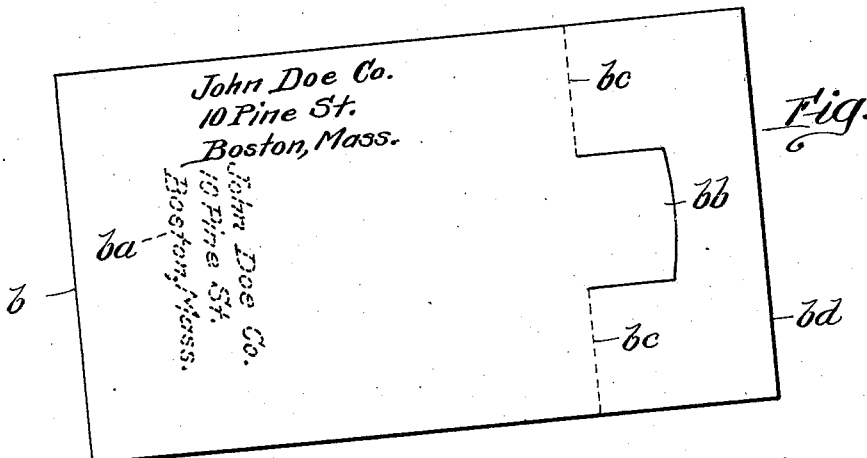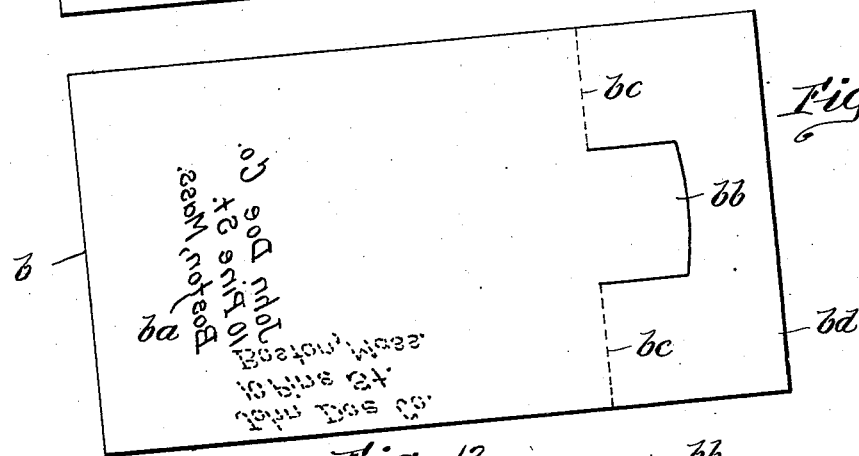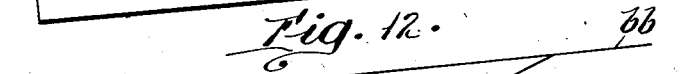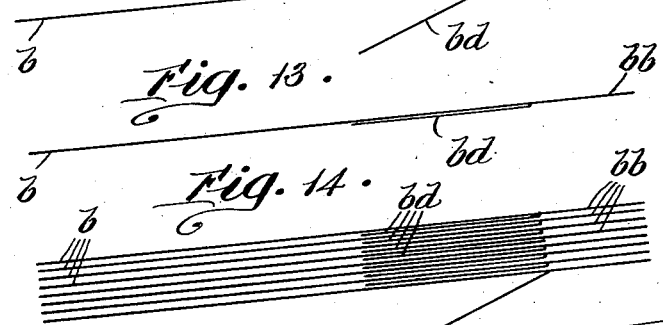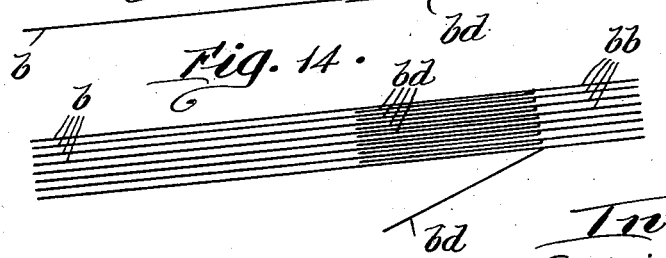

Patented Sept. 15, 1936

2,054,344

UNITED STATES PATENT OFFICE 2,054,344

ADDRESSING MACHINE

Frederick W. Storck, Arlington, Mass., assignor to Standard Mailing Machines Company, Everett, Mass., a corporation of Massachusetts Application March 16, 1935, Serial No. 11,447

15 Claims. (Cl. 101—52)

This invention relates to duplicating machines wherein a master is formed in reverse with suitable copying ink and the matter to be printed upon is previously moistened with a quick diffusing and drying ink solvent as shown and described in my United States Letters Patent No. 1,964,933, dated July 3, 1934, and this present invention relates more particularly to addressing mail matter with an adaptation of the duplicating principles embodied in my referred to patent.

In the usual type of addressing machines, it is well known that a single address is formed on a master stencil or on various forms of metallic printing platens with type. In each of these instances the stencil or printing platen must be provided with a continuous ink supply to accomplish the subsequent duplicating of the master address upon the mail matter as it is engaged with the masters in a consecutive sequence.

Addressing machines are employed on various types of mailing lists, many of which are continuously changing, due to mortality or additions and which, in many instances, are extensive.

In utilizing the stencil or metallic form of address it becomes necessary to employ special equipment in forming the addresses thereon for use in connection with an addressing machine. Further, this type of master is ordinarily limited to a conventional form of type.

It is obvious that continued mortality and additions require added costs to the item of addressing, which, in instances, negative some of the advantages in the use of an addressing machine.

Again, there are numerous occasions where a mailing list is desired for only a limited number of mailings. In this instance, cost in producing the list and applying it to the mail matter is of paramount importance.

Therefore, in view of the above, a primary object in my present invention is to provide a method of addressing single pieces of mail matter wherein the masters utilized may be formed at a minimum cost by a typewriter and the use of carbon paper to form the address in reverse on the master.

Another object in my present invention is to provide a machine of simplified and efficient construction for singularly engaging a moistened portion of a piece of mail matter with a master address made in reverse with suitable copying ink and then subjecting them both to pressure.

A further object of my present invention is to provide a master record address of a simplified and economical construction and adapted to be engaged in a direct relation to and advanced by the mail matter upon which the master address is to be duplicated.

A still further object of my invention is to provide means for stripping the master record from the mail matter upon which it has been duplicated and further depositing each in a separate receiving hopper.

In the accompanying drawings I have shown my invention sufficient to enable those skilled in the art to understand the construction and operation thereof.

Referring to the drawings:

Fig. 2 is a rear side elevation of my machine showing the drive connections.

Fig. 3 is a longitudinal section of my machine taken substantially along line 3—3, Fig. 1.

Fig. 4 is a sectional view taken substantially along line 4—4, Fig. 3.

Fig. 5 is a horizontal section of my master address magazine.

Fig. 6 is a diagrammatical view with parts of my machine shown in section and showing a piece of mail matter to be printed upon in its initial engagement with a master address record.

Fig. 7 is a view corresponding substantially to Fig. 6, but shows the envelope and master in an advanced position.

Fig. 8 is a diagrammatical view of a master being stripped from a printed envelope.

Fig. 9 is a detailed longitudinal view of my fluid feed and supply reservoir.

Fig. 10 is a plan view of the front face of one of my master address records.

Fig. 11 is a view of the opposite or back face of the master record as shown at Fig. 10 and shows the record address formed in reverse.

Fig. 12 is a side edge view of the master record as shown at Fig. 10, but shows the flap bent to a depending position.

Fig. 13 is a view corresponding to Fig. 12, but shows the flap bent backward upon the back face of the master record.

Fig. 14 shows several master records in a stacked formation with the flap of the lowermost depending therefrom.

Fig. 15 is a front view of a modification of my master record magazine stripper gate.

Fig. 16 is a section taken along line 16—16, Fig. 15.

Figure 1:
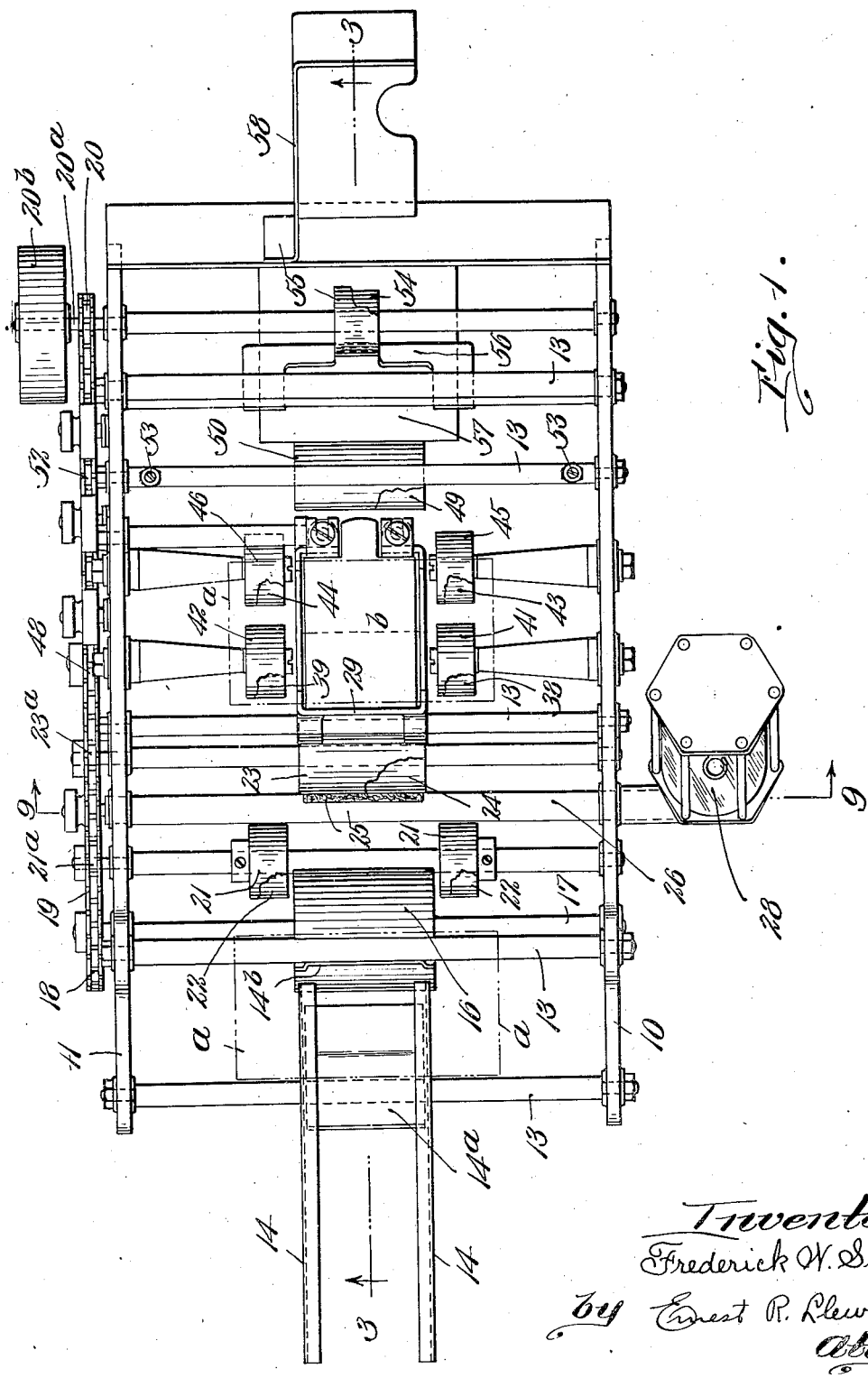
Fig. 1 is a plan view of my addressing machine.

As illustrated in the drawings the side frames 10, 11 are retained in spaced relation by suitable tie rods 13. A suitable stationary magazine is provided for supporting the mail matter to be printed upon. This magazine 14 is provided with an adjustable plate 14a for receiving envelopes or the like of various widths. The front portion 14b of the magazine is provided with a resilient stripper member 15 which engages with a rotatable stripper drum 16.

This stripper drum 16 is mounted on a shaft 17, which in turn is mounted in suitable bearings in the side frames 10, 11 and which has secured to the outer end thereof a sprocket 18. This sprocket 18 engages with and is driven by a continuous drive chain 19, which in turn is rotated by a sprocket 20 secured on the shaft with the main drive pulley 20b. This drive pulley shaft 20a may be rotated by any suitable source of power in a desired manner.

The stripper drum 16 is provided in this instance with a friction element or area 16a which is adapted to engage the advanced edge of the lowermost piece of mail matter a, supported in the magazine 14, and advance it between the drum 16 and the stripper 15 into engagement with primary friction feed rolls 21, 21, 22, 22, which are positioned adjacent the stripper drum 16. The upper rolls 21 are directly rotated by an outboard sprocket 21a which is engaged by the driving chain 19, the lower rolls 22 being frictionally driven by the upper rolls 21.

Positioned in advance of the primary rolls 21, 22, I have shown one method of moistening the mail matter to be printed upon, and in which my applicator comprises one of a pair of feed rolls 23, 24. These rolls 23, 24 are disposed relative to the portion of the mail matter to be moistened. The upper roll 23 is driven by an outboard sprocket 23a in engagement with the drive chain 19 and the lower roll 24 is frictionally driven by the roll 23.

In my preferred form the upper roll or applicator 23 is of a non-absorbent character and its coacting roll 24 is of a resilient character. These rolls 23, 24 may be of a character as described in my United States Letters Patent No. 1,988,056, dated January 15, 1935, although a roll of a non-absorbent character and a coacting roll of rubber or like resilient material is preferable in my present invention for addressing mail matter.

This preferred construction is occasioned by the fact that when envelopes are to be printed upon, various thicknesses of material are embodied in the envelope, the envelope body would be of two thicknesses, the envelope flap would present, in sections, three to four thicknesses, etc., as is obvious from the inspection of an ordinary envelope.

Obviously a roll of a less resilient character than rubber would eventually cause depressions and ridges where excessive pressure has developed between the rolls by these variances in the thicknesses.

Moisture is supplied to the applicator 23 by means of a bibulous material or wick 25 which engages with the applicator 23 and extends into a substantially enclosed tank 26 which is suitably supported adjacent the applicator 23.

One end of the tank 26 is provided with a fitting 27 adapted to receive the spout 28a of a movable supply reservoir 28. The reservoir spout 28a extends into the fitting 27 and connecting chamber of the tank so that the spout opening 28b will effectively control the level of liquid in the tank as shown and described in my co-pending application Serial No. 9,151.

As the advancing mail matter is engaged and advanced through the feed rolls 23, 24 the applicator 23 will deposit a thin, even film of liquid on the area to be printed upon.

Positioned in advance of the applicator and feed rolls is a master record magazine 29 secured to one of the tie rods 13a and a front support 13b. This magazine 29 is adapted to support a plurality of record cards b or the like, having indicia ba formed thereon in reverse. For convenience in understanding, the master face having the indicia in reverse thereon will be termed the back face.

In this instance the record card b is cut, as shown by full lines Figs. 10, 11, to form a tab bb, and the card scored as indicated by broken lines bc for bending to form a depending tab bd as shown at Figs. 12, 13 and 14.

For convenience in filing, indicia may be correctly formed in a convenient location on the front face of the master, as illustrated at Fig. 10.

The master records b are placed in the magazine 29 in stacked formation, as illustrated at Fig. 14, with their tabs bb projecting through a suitable opening 29a in the front wall of the magazine and their depending tabs bd folded against the back face of the masters.

The front portion of the magazine bottom is cut away to permit the advanced portion of the lowermost master and its depending tab bd to project therethrough. The depending tab bd engages a transverse support 30, which positions the advanced portion of this lowermost master, slightly below the line of travel of the mail matter to be printed upon.

Adjustable gate members 31, 32 are provided and disposed at opposite sides of the magazine opening 29a, see Fig. 4. These gate members 31, 32 are each provided with angularly disposed lower guide ends which are adjusted relative to the transverse support 30 so as to permit the removal of only a single master from the magazine in a consecutive order.

At Figs. 15 and 16 I have shown a modification of my stripper gate in which the front portion of the magazine is provided with adjustable plates 33, 34 disposed at either side of the magazine tab opening 35. Each of the plates 33, 34 is provided with a depending resilient stripper 36, 37 adapted to be engaged with the master support 30 so as to permit the stripping of a single master from the magazine in a consecutive order.

As the mail matter a is advanced from the magazine 14 through the moistening and feeding rolls 23, 24 it is engaged and further advanced by driven feed rolls 38, 39, secured on a transverse shaft 40, and their coacting, frictionally driven rolls 41, 42. The roll shaft 40 is provided with an outboard sprocket 40a in engagement with and rotated by the drive chain 19.

These last mentioned feed rolls 38, 39, 41, 42 engage the outer end portions of the now moistened mail matter and advance it into engagement with like forward feed rolls 43, 44, 45 and 46. The lower rolls 43, 44 are secured on a transverse shaft 47 which is provided with an outboard sprocket 48 in engagement with and rotated by the drive chain 19, the upper rolls 45, 46 being frictionally driven by the lower rolls 43, 44.

During the advancing of the mail matter *a* by the last mentioned feed rolls 38, 39, 41, 42, 43, 44, 45 and 46, the moistened portion of said mail matter *a* is disposed in the engaging path of the master record and as the mail matter is further advanced the forward edge of said mail matter will engage the depending flap *bd* of the master and cause the same to be singularly stripped from its magazine 29 and advanced with the mail matter *a* into engagement with pressure feed rolls 49, 50, see Fig. 7, which engages the moistened area of the mail matter and the record address together under pressure as they pass between these rolls and thereby the address on the record card is duplicated on the mail matter.

The lower pressure roll 49 is secured to a shaft 51 extending transversely through the machine and is provided with an outboard sprocket 52 in engagement with and rotated by the drive chain 19. The upper pressure roll is rotatably mounted in suitable bearings to permit adjusting the pressure of the roll 50, as by means of adjusting screws 53 or other suitable pressure adjusting means.

When the two elements *a* and *b* are fed between the pressure rolls 49, 50 the advanced tab *bb* of the master record *b* will be engaged by forward stripper feed rolls 54, 55, while the opposed forward edge end portions of the mail matter will engage a stop guide 56. The lower stripper feed roll 54 is secured to and rotated with the main drive shaft 20a.

When the advancing edge of the mail matter *a* engages the stop guide 56 said matter is deflected downwardly out of engagement with the master record *b* and into the mail matter receiving hopper 57, see Figs. 3 and 8, while the master record *b* is advanced, by the feed rolls 54, 55, into its individual receiving hopper 58.

Sequence of operation

The mail matter *a* is stacked in the magazine 14 with the lowermost piece in contact with the stripper drum 16. The magazine records *b* are stacked in the magazine 29, with the master address printed in reverse on the under face. The lowermost record *b* projects through the bottom of the magazine with its advanced edge and depending tab *bd* in engagement with a stripper support 30.

Power is now applied to the drive shaft 20a and the feed rolls and stripper drum 16 are rotated in unison.

As the stripper member 16a engages the advanced edge of the lowermost piece of mail matter *a*, this piece is singularly stripped from the magazine 14, beneath the yielding stripper member 15. The stripped mail matter is advanced, by the stripper drum 16, into engagement with the feed rolls 21, 22, and hence into engagement with the moistening and feed rolls 23, 24.

In this instance, as the mail matter advances through the moistening and feed rolls 23, 24, a thin film of fluid is deposited on the upper face of the mail matter by the applicator 23.

From the moistening and feed rolls 23, 24 the piece of mail matter is further advanced into engagement with the lowermost master record *b* and this master record is stripped from its magazine by engaging with the advancing mail matter. The mail matter with its engaged master record is then advanced by the feed rolls to the pressure feed rolls 49, 50 which cause the master address, formed in reverse on the master, to be correctly duplicated on the moistened face of the mail matter.

As the two elements are advanced through the pressure feed rolls 49, 50, the tab *bb* of the master *b* will be engaged by advanced stripper feed rolls 54, 55; while continued advance of the mail matter is prevented by a stop guide 56 which engages the advancing edge of the mail matter and causes it to be deflected downwardly, away from the master record, and into its receiving hopper 57.

The stripper rolls 54, 55 will cause the stripped master record *b* to continue to be advanced and deposited in its receiving hopper.

On each revolution of the stripper drum 16 the stripping member 16a will engage a consecutive lowermost piece of mail matter and advance it into engagement with the lowermost master record and duplicate thereon a master address as above described.

Having thus described a preferred embodiment of my invention, it is obvious that rearrangements and changes may be made therein by those skilled in the art without departing from the spirit and scope thereof, therefore, I do not wish to be limited to the specific details herein disclosed, but what I claim is:—

1. A machine for addressing mail matter in which the mail matter to be printed upon is previously moistened with a quick diffusing and rapid drying fluid solvent, which comprises a magazine for a stack of mail matter, a magazine for a stack of individual members with ink characters in reverse, each of said members having a depending portion adapted to project below said last magazine when one of said members is in its lowermost position, means for stripping the lowermost piece of mail matter from said stack, feeding means for advancing said last piece of mail matter into engagement with the depending portion of said first member and concurrently advancing said member and mail matter in engaged relation to subsequent pressure feed rolls.

2. A machine for addressing envelopes, and the like, in which the envelopes, or the like, to be printed upon are previously moistened with a quick diffusing and rapidly drying fluid solvent which embodies a magazine for a stack of envelopes, a magazine for a stack of individual members with ink characters in reverse, each of said members having a depending portion adapted to project below said last magazine when said member is in its lowermost position, means for stripping the lowermost envelope from said stack, feeding means for advancing said last envelope into engagement with the depending portion of said first member and concurrently advancing said member and envelope in engaging relation to subsequent pressure feed rolls, means in advance of said pressure feed rolls adapted to severally disengage said envelope and member.

3. A machine as set forth in claim 2 in which the means in advance of said pressure feed rolls adapted to severally disengage said envelope and member comprises, guide means for deflecting said envelope into a receiving magazine with feed means for advancing said member to a receiving magazine separate from said first magazine.

4. A machine for addressing mail matter, in which the matter to be printed upon is previously moistened, an adjustable magazine for a stack of mail matter, means for stripping the lowermost of said matter and advancing the same to a receiving hopper, superimposed moistening means engaging in the travel line of said matter, a superimposed magazine in advance of said first magazine and moistening means, a plurality of individual members disposed within said last magazine, said members having ink characters in reverse, means associated with the lowermost member whereby said member is concurrently stripped from said last magazine by said mail matter during the advancing of said matter and with means subjecting them both to pressure.

5. A master record for addressing mail matter which comprises a body portion adapted to have ink characters in reverse, a depending portion integral with said body and adapted to be bent back upon said body portion.

6. A master record for addressing mail matter which comprises a body portion adapted to receive ink characters in reverse, a tab portion integral with said body portion and projecting therefrom substantially in the plane of said body, a depending portion integral with said body and adapted to be bent back upon said body.

7. A machine for addressing mail matter in which the matter to be printed upon is previously moistened, having a magazine for a stack of mail matter to be printed and a magazine for a plurality of record addresses, combined feed and moistening rolls in advance of said magazine, means for stripping the lowermost of said matter and advancing the same into engagement with said rolls, a fluid tank disposed adjacent said rolls, a bibulous material disposed within said tank and engaging one of said rolls to convey moisture by capillary attraction to said roll, means for sequentially advancing a piece of mail matter from said magazine into engagement with said moistening means and one of said record addresses.

8. A machine for addressing mail matter in which separate indicia are to be applied to each piece of said matter and in which the matter to be printed upon is previously moistened, having a magazine for a stack of mail matter to be printed, feed rolls disposed in advance of said magazine, means for stripping the lowermost of said matter and advancing the same into engagement with said rolls, a moistening applicator disposed to engage one face of said matter as said matter is advanced, with means for providing moisture by capillary attraction to said applicator, means for advancing said moistened face into sequential engagement with a master record address formed in reverse and subjecting them both to pressure.

9. A machine for addressing mail matter, in which the matter to be printed upon is previously moistened, having a magazine for a stack of individual members each having ink characters in reverse with means for sequentially engaging the lowermost of said members with a previously moistened piece of mail matter and in a direct relation thereto and thereafter subjecting them both to pressure.

10. A machine for addressing mail matter in which the matter to be printed upon is previously moistened, having a magazine for a stack of pieces of mail matter to be printed upon and a magazine for a plurality of members, each of said members having an individual address with ink characters in reverse, means for stripping one of said pieces of mail matter from its magazine and advancing the same, a moisture applicator disposed to engage said matter as it is advanced, with means to supply moisture by capillary attraction to said applicator, obstructing means subsequent to said applicator and in the advancing path of said matter and operated upon by said matter whereby one of said address members is stripped from its magazine and advanced in engaging relation with said advancing piece of mail matter to subsequent pressure means.

11. In a device of the character specified, the combination of means for feeding a piece of mail matter, a master address-bearing sheet a forward portion of which is folded backwardly at an acute angle to the body thereof and means for disposing said master sheet in the path of feed of said mail matter in a manner whereby the advance edge thereof may engage said master sheet between the body thereof and said folded back portion and forward said master sheet in fixed juxtaposition with said piece of mail matter.

12. In a device of the character specified, the combination of means for feeding a piece of mail matter, a master address-bearing sheet a forward portion of which is folded backwardly at an acute angle to the body thereof and means for disposing said master sheet in the path of feed of said mail matter in a slightly angular position with respect thereto, in a manner whereby the advance edge of said piece of mail matter may engage the face of said master sheet and slide along the same and become inserted between the body of said sheet and said backwardly folded portion and thus engage and forward said master sheet in fixed juxtaposition with said piece of mail matter.

13. In a device of the character specified, the combination of means for feeding a piece of mail matter, a master address-bearing sheet a forward portion of which is folded backwardly at an acute angle to the body thereof, a hopper located above the path of feed of said mail matter for holding a stack of said master sheets, the bottom of said hopper being obstructed in its rearward part and open in its forward part whereby the rearward end of the lowermost of the master sheets therein may be held in an elevated position above the path of feed of said piece of mail matter while the forward end of said master sheet is free to drop below the path of feed of said mail matter, and means for supporting the forward end of said master sheet below the path of feed of said mail matter.

14. In a device of the character specified, the combination of a master address-bearing sheet a forward portion of which is folded backwardly at an acute angle to the body thereof leaving a forwardly projecting portion, means for feeding a piece of mail matter with its forward edge inserted between the body of said master sheet and the said backwardly folded portion thereof, whereby said master sheet and said piece of mail matter are carried along in fixed juxtaposition, a stop member for arresting the progress of said piece of mail matter and means for engaging the forwardly projecting portion of said master address-bearing sheet, upon the engagement of said piece of mail matter with said stop element, and removing the said master sheet from association with said mail matter.

15. A machine for addressing mail matter in which separate indicia are to be applied to each piece of said matter and in which the matter to be printed upon is previously moistened, having a magazine for a stack of individual members each having ink characters in reverse with means for sequentially engaging said members with previously moistened mail matter and subjecting them both to pressure.

FREDERICK W. STORCK.